June 5, 1951  C. E. MURRAY  2,555,808
LIFTING MEANS FOR MOTOR VEHICLE AXLES
Filed April 13, 1946  2 Sheets-Sheet 1
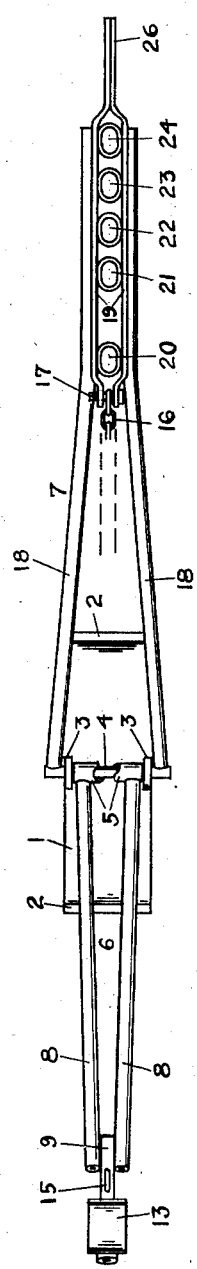
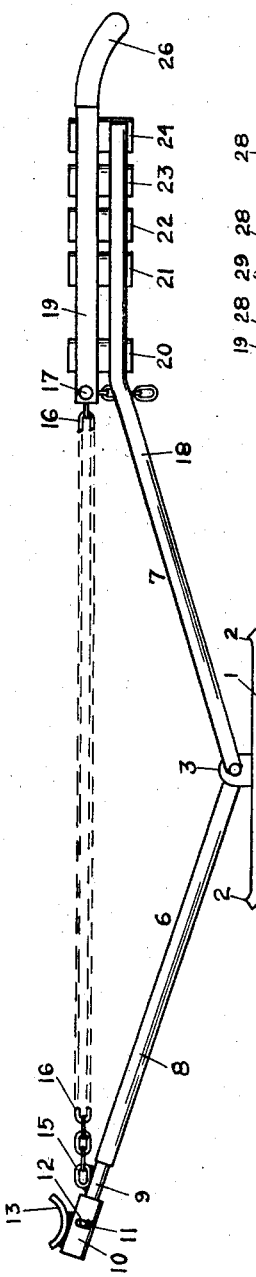
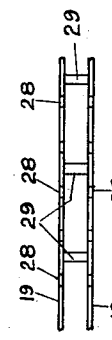
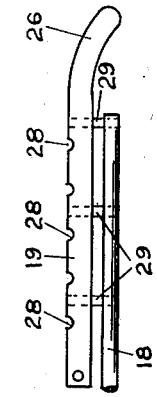
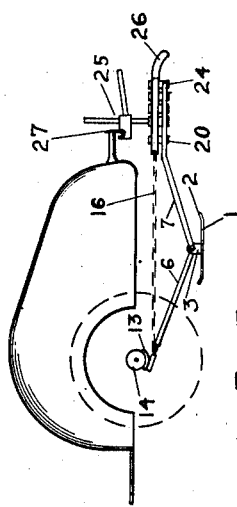
INVENTOR.
C. E. MURRAY
BY
Merrill M. Blackburn, ATTY.

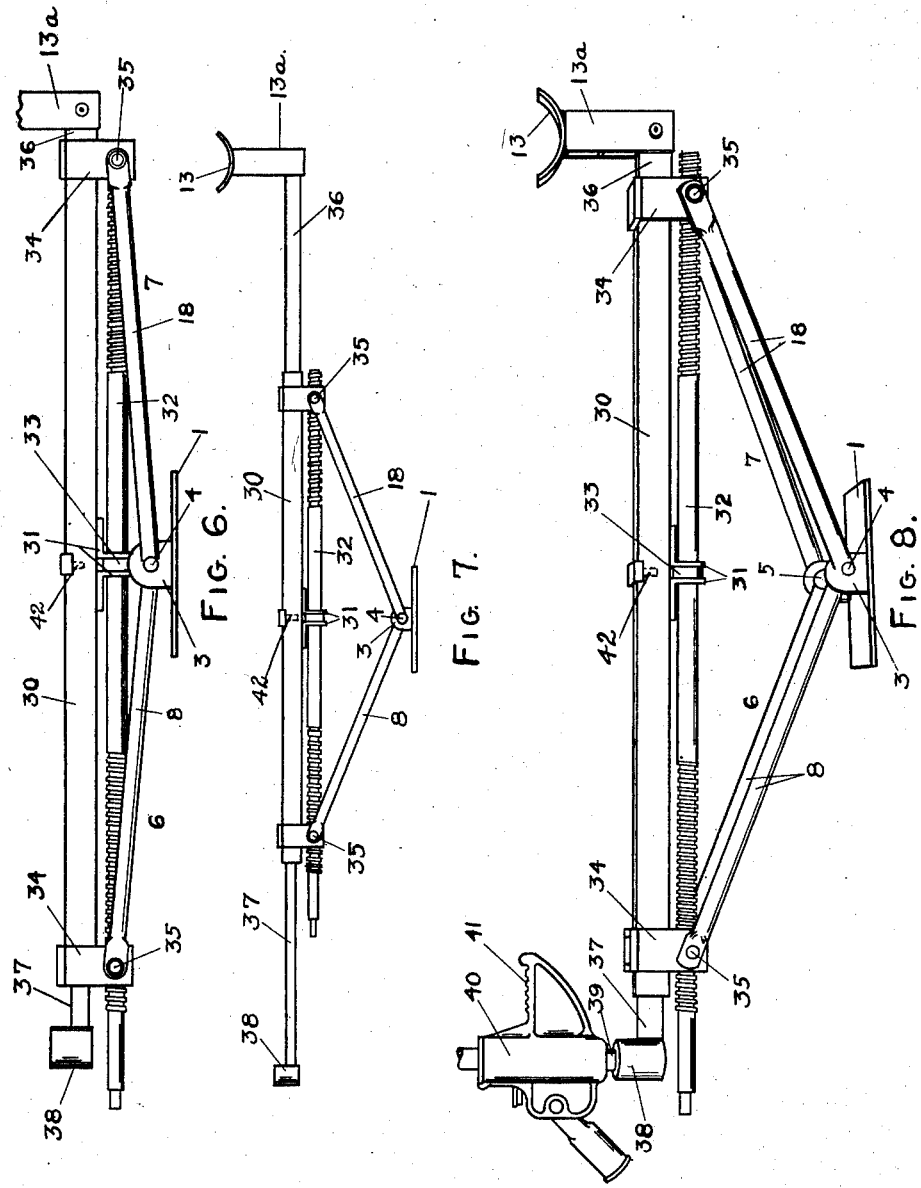

Patented June 5, 1951

2,555,808

UNITED STATES PATENT OFFICE 2,555,808

LIFTING MEANS FOR MOTOR VEHICLE AXLES

Clay E. Murray, Davenport, Iowa

Application April 13, 1946, Serial No. 661,918

11 Claims. (Cl. 254—119)

My present invention relates to means for lifting automobile axles when it is desired to remove a wheel or change tires, or when it is desirable for any other reason to lift the axle. With present day cars, provided with long, sweeping fenders and with bumpers located remotely from the axle, it is almost impossible to get an ordinary car jack located under the axle and operated for the lifting thereof. When using a bumper jack to lift the car so that a wheel or tire can be removed, it is necessary to lift the body far above the axle before the latter begins to rise. There is the further disadvantage with the use of a bumper jack that a large part of the weight of the body is removed from the corresponding wheel on the opposite side of the car when one side of the body is lifted high enough to raise from the ground the wheel adjacent the jack and there is then little to keep the jack from tilting sidewise and letting the car down.

It is therefore among the objects of my invention to provide a lifting means whereby a bumper jack may be used to lift both the axle and the body of a car substantially simultaneously; to provide a lifting device which will be stable when in use and will not run any risk of tipping over sidewise and permitting the car to drop; to provide a device for the purpose indicated which is adapted for use with cars of varying length between the axle and the bumper; and such further objects, advantages, and capabilities as will hereafter appear and as are inherent in the structure disclosed herein. My invention further resides in the combination, construction, and arrangement of parts illustrated in the accompanying drawings and, while I have shown therein what is now regarded as the preferred embodiment of this invention and a modification thereof, I desire the same to be understood as illustrative only and not to be interpreted in a limiting sense.

In the drawings annexed hereto and forming a part hereof,

Fig. 1 represents a plan view of a structure built according to my invention;

Fig. 2 represents a side elevation thereof;

Fig. 3 represents a view in side elevation of this construction shown as applied to the rear end of an automobile for the lifting of the axle, the position of the wheel being shown in broken lines;

Fig. 4 represents a plan view of a modified end portion of the structure shown in Figs. 1 to 3, inclusive;

Fig. 5 represents a side elevation of a structure somewhat similar to the disclosure of Fig. 4;

Fig. 6 represents a side elevation of the preferred form of this invention, the same being shown collapsed for storage;

Fig. 7 represents a view, similar to the disclosure of Fig. 6, of this structure extended for use; and Fig. 8 represents this structure with a jack applied to one end.

As shown in the present drawings, this structure comprises a supporting base plate 1 having its two ends turned up slightly, as indicated at 2, said base plate having a pair of ears 3 extending upwardly and provided with holes for the reception of the pivot pin 4. This structure also comprises a pair of supporting arms 6 and 7, each made up of a pair of pipes or rods welded to the sleeve 5, in the case of arm 6, and to the pin 4, in the case of arm 7. Since the sleeve 5 may turn on the pin 4, the arms 6 and 7 are pivoted relative to each other and to the plate 1. In Fig. 1, the pipe 5 is shown with a portion broken away to expose the pin 4.

The pipes 8 of the arm 6 are welded to the short pipe or rod 9, the outer end of which is surrounded by a short piece of pipe 10 having a slot 11, or a pair of opposite slots, in opposite sides thereof. The pin 12 and slot connection permit the sleeve 10 to turn somewhat about the pipe 9 as an axle but limits the amount by which the sleeve may turn. Welded to the upper side of the sleeve 10 is an arcuate supporting member 13 designed to engage the under side of the axle 14 of the car. When this is pressed upwardly against the under side of the axle, it is held rigidly in place with respect to the axle. However, it may rock slightly on the shaft or rod 9 in order to accommodate itself to the changing direction of the axle. The end link 15 of the chain 16 is welded to the shaft 9, while the second end of the chain is adjustably connected to the pin 17.

As above indicated, the two pipes connected to the pin 4 constitute the arm 7 which is pivotally connected to the plate or foot 1 and also to the arm 6. A pair of plates 19 are rigidly connected, preferably by welding, to the tubes 20, 21, 22, 23, and 24 which serve as sockets for the jack 25. The extreme ends of these plates 19 are bent downwardly to form a handle 26 for the more ready manipulation of this unit. As is apparent from Fig. 1, the tubes 20 to 24, inclusive, are flattened somewhat to make elongated sockets which will permit tilting of the jack somewhat in order to permit it to accommodate itself to the position of the bumper 27.

In the modified form of construction shown in Figs. 4 and 5, the sockets 20 to 24, inclusive, are dispensed with and notches 28 are formed in the upper edges of the plates 19. A cross pin, not shown, extends laterally from the shaft of the jack 25 and rests in one or another of the pairs of notches 28, thus permitting relative adjustment between the supporting member 13 and the jack 25, depending upon the distance between the axle 14 and the bumper 27. The notches 28 serve the same purpose as the oval shaped pipes 20 to 24, referred to above. Plates 29 are arranged between the plates 19' and are welded thereto. These plates 29 are also welded to the shafts 18 to make of this a rigid structure. This is provided with a handle 26'.

Since the height of axles and bumpers varies, it is necessary to vary the height of the two ends of this apparatus with relation to the plate 1, but this can be done by removing the pin 17 and passing it through one or another of the links of the chain 16 so as to adjust the distance between the link 15 and the pin 17. If this distance is shortened, then the support 13 or the sockets 20 to 24, inclusive, or both, will be raised relatively to the plate 1. Increasing the distance between the link 15 and the pin 17 will have the opposite effect. This adjustment is necessary in order to get the proper distance between the support 13 and the jack 28, so that the jack may operate to raise the car body and the axle. When the support 13 of this implement is placed under the axle and the jack shaft is placed in the proper one of the tubes and then the jack is actuated, the first thing to happen is that the bumper is raised and, with this, this part of the car is elevated. When the weight of the car on this side of the vehicle has been sufficiently lifted from the spring, further operation of the jack will result in the axle 14 being lifted. The axle does not begin to rise at the same time as the bumper because of the weight of the axle and wheel.

In the preferred structure, shown in Figs. 6, 7, and 8, use is made of a rectangular pipe 30 to which a pair of brackets 31 are secured. A right and left hand threaded screw 32 passes through these brackets and has a collar 33 secured thereto, the same being located between the brackets to prevent endwise movement of the screw relatively to the pipe 30. Upon each end of the pipe 30 is slidably mounted a bracket 34, having two arms straddling the pipe 30. Between these arms is a nut which cooperates with the screw 32. Pivots 35 extend laterally from opposite sides of the brackets 34. These may either be secured to the brackets 34 or extend laterally from the nuts within the brackets, with their ends passing through the ends of the rods or pipes 8 and 18 which are flattened, as shown.

In consequence of this construction, when the screw 32 is turned, the brackets 34 are caused to approach or recede with the result that the pipe 30 is raised. One end of the screw 32 is made angular, preferably square or triangular, and to this a socket wrench of common form may be applied for operation of the lifter.

A bracket 13a connects the supporting member 13 to the pipe 36 which fits rather closely in the pipe 30, yet slides freely therein. A similar pipe 37 slides in the second end of the pipe 30 and has a socket 38 for reception of the shaft 39 projecting downwardly from the jack 40. Fig. 6 shows this lifting device collapsed while Figs. 7 and 8 show it partly elevated as in raising a vehicle.

Ordinarily, this apparatus, when collapsed, as shown in Fig. 6, will not be long enough to reach from the vehicle axle to the bumper, except, possibly, at the front of the vehicle. It will therefore be necessary to extend bar 36 partly before placing the lifter under the vehicle. The supporting member 13 is then placed under the axle by moving the lifter forwardly or backwardly until the part 13 is under the axle. Then, if necessary, the bar or pipe 37 is extended so that the step 41 of jack 40 will be under the bumper. Next, by operating the screw 32, the supporting member 13 and the step 41 are brought up into engagement with the axle and bumper. If the vehicle is not too heavy, it can be lifted so that the wheel is no longer supported by the ground. If the vehicle is too heavy to be raised in this way, it can be lifted by operation of the jack.

A pin 42 carried by a block which straddles the pipe 30 may be inserted into holes in the pipes 30, 36, and 37 to hold them in adjusted relation when they have been adjusted to have the desired spacing between the parts 13 and 38 or 13 and 41. The parts 36 and 37 are made or selected so that the part 37 slides freely in the part 36. Also, a short piece of pipe of the size of pipe 36 is mounted in the end of pipe 30 to furnish a bushing through which the pipe or bar 37 may slide, the bushing serving to hold part 37 against undue wobbling in the pipe 30. It is also to be understood that part 37 may be either a bar or a pipe.

The plate 1 can be made flat, as shown in Figs. 6 to 8, or with its ends turned up, as in Figs. 1 to 3.

When this implement, if constructed as shown in Sheet 1, has served its immediate purpose and the car is again ready to move on, the implement may be folded about its pivot pin 4, to reduce the length thereof, and then it may be put in the tool box or wherever else such equipment is carried. If constructed as shown on Sheet 2, it can be collapsed, as shown in Fig. 6, and stored as desired.

It is of course understood that the specific description of structure set forth above may be departed from without departing from the spirit of this invention as disclosed herein and as defined by the appended claims.

Having now described my invention, I claim:

1. A lifting implement for motor vehicle axles comprising a supporting foot, a pair of rigid arms pivotally connected to each other and to the foot, the free ends of the arms extending in opposite directions from the foot, tension means connecting said free ends to hold them a fixed distance apart during use, means adjacent the free end of one of the arms for engagement with a vehicle axle, and means at the opposite end of the arm for the reception of a vehicle jack, said jack having a laterally extending arm to receive a vehicle bumper and exert a lifting force thereon.

2. A structure for the purpose described comprising a foot having a pair of lugs projecting upwardly therefrom, a pair of arms pivotally connected to said lugs and extending in opposite directions therefrom, a tie member connecting opposite end portions of said arms, means at one end of one of said arms for engaging and for communicating lifting force to a motor vehicle axle, means adjacent the remote end of the other arm for receiving and holding a jack, and a jack connected to said remote end to engage and lift a car bumper.

3. A structure for the purpose described comprising a foot having a pair of lugs projecting upwardly therefrom, a pair of arms pivotally connected to said lugs and extending in opposite directions therefrom, a tie member connecting opposite end portions of said arms, means at a remote end of one of said arms for engaging and for communicating lifting force to a motor vehicle axle, and means adjacent the remote end of the other arm for receiving and holding a jack, said tie member being adjustably connected to at least one of said arms.

4. A structure of the character indicated comprising a ground-engaging member, arms pivotally connected thereto and, in use, extending in opposite directions therefrom, said arms being adapted to be turned to extend in the same direction, flexible means connecting the end portions of said arms remote from their pivotal connection, and means adjacent the end of one of said arms remote from the pivot for holding positioned a lifting means.

5. An axle-lifting machine comprising a supporting member having a pair of oppositely extending arms pivotally connected thereto, one of said arms having an axle-receiving trough secured adjacent its free end, the other arm having sleeves rigidly secured thereto adjacent its free end to serve as receptacles for an end of a lifting means, and a flexible tie member connecting the free end portions of said arms.

6. A lifting mechanism of the type disclosed comprising a supporting plate or block, a pair of arms pivotally connected at one end to each other and to the plate or block, nuts pivotally connected to the second ends of said arms, a screw extending through said nuts and adjustably connecting them to each other so that the second ends of the arms can be drawn toward each other by turning the screw, a pipe fixed longitudinally relatively to said screw, said nuts being slidable along said pipe, bars slidable longitudinally within said pipe, and means connected to the remote end portions of said bars for engagement with a vehicle axle and bumper.

7. A structure for the purpose indicated comprising a pipe, bars fitting in said pipe and slidable lengthwise therein, engaging members on said bars for engaging an axle and bumper of a motor vehicle, brackets slidably connected with the end portions of said pipe, a screw threaded oppositely at its two end portions, nuts operatively connecting said screw and said brackets to cause sliding of the brackets along the pipe when the screw is turned, a supporting member to rest on the ground or the like, and arms pivotally connected at one end to the supporting member and to each other, and connected at their other ends to the brackets.

8. A jack for an automobile having a wheel axle and a bumper adjacent to said axle, said jack comprising an upright support adapted to rest on a ground surface, means forming an elongated lever, means pivotally supporting said lever intermediate its ends on said support for up and down pivotal movement, a jacking device supported adjacent one end of said lever in engagement with said lever and the under side of said bumper, the opposite end of said lever being adapted for engagement with the under side of said axle.

9. In combination, a vehicle axle lifting means, a plate for serving as a ground-engaging foot, a pair of arms pivotally interconnected and pivotally connected to said plate, said arms, when in use, extending in divergent directions from their pivotal connection, an elongate connecting member connecting the remote end portions of said arms whereby to prevent straightening beyond a limited extent, and means for communicating lifting force, respectively, to a vehicle axle and to the adjacent vehicle bumper, mounted on each of said arms at the remote end portions thereof.

10. A structure as defined by claim 9 in which the elongate connecting member is foldable.

11. A jack for a vehicle having a wheel axle and a bumper adjacent to said axle, said jack comprising a support adapted to rest on a ground surface, means forming an elongate lever, said lever being pivotally supported by said support for pivotal movement in a substantially vertical plane, and a jacking device supported by said lever adjacent one end thereof for engagement with the under side of said bumper, the opposite end of said lever being adapted for engagement with the under side of said axle.

CLAY E. MURRAY.

REFERENCES CITED

The following references are of record in the file of this patent:

UNITED STATES PATENTS

| Number | Name | Date |
| --- | --- | --- |
| 1,064,191 | Bunn | June 10, 1913 |
| 1,204,973 | Graver | Nov. 14, 1916 |
| 1,281,491 | Black | Oct. 15, 1918 |
| 1,443,913 | Ellis | Jan. 30, 1923 |
| 1,638,859 | Knowles | Aug. 16, 1927 |
| 2,143,184 | Barr | Jan. 10, 1939 |
| 2,222,116 | Mott | Nov. 19, 1940 |
| 2,233,536 | Kelly | Mar. 4, 1941 |
| 2,260,993 | Johnston | Oct. 28, 1941 |
| 2,358,501 | Frova | Sept. 19, 1944 |

FOREIGN PATENTS

| Number | Country | Date |
| --- | --- | --- |
| 518,113 | France | Dec. 24, 1920 |
| 645,975 | France | July 9, 1928 |